United States Patent [19]

Gitlin

[11] Patent Number: 4,995,104
[45] Date of Patent: Feb. 19, 1991

[54] INTERFERENCE CANCELLING CIRCUIT AND METHOD

[75] Inventor: Richard D. Gitlin, Little Silver, N.J.

[73] Assignee: AT&T Bell Laboratories, Murray Hill, N.J.

[21] Appl. No.: 348,442

[22] Filed: May 8, 1989

[51] Int. Cl.$^5$ ............................................... H04B 3/14
[52] U.S. Cl. ....................................... 370/6; 370/32.1; 455/295; 375/102; 379/417; 328/163
[58] Field of Search ....................... 370/6, 24, 32, 32.1; 375/102; 455/303, 304, 305, 306, 295; 379/417; 328/162, 163, 165

[56] References Cited

U.S. PATENT DOCUMENTS 3,648,171  3/1972  Hirsch ................................. 325/42
4,112,370  9/1978  Monsen ................................ 370/6
4,412,341 10/1983  Gersho et al. ...................... 375/102
4,581,586  4/1986  Rubin ................................ 455/295
4,755,984  7/1988  Ambrosio et al. ................. 370/32.1
4,908,581  3/1990  Honjo ............................... 455/305

Primary Examiner—Douglas W. Olms
Assistant Examiner—Min Jung
Attorney, Agent, or Firm—John A. Caccuro

[57] ABSTRACT

A receiver includes an interference canceller circuit which receives a corrupted signal and makes an estimate of the desired signal. Subsequently, an estimate of the interference signal is determined by subtracting the estimated desired signal from a delayed version of the received signal. The receiver forms a final estimate of the desired signal by subtracting the estimated interference from a second delayed version of the received signal.

15 Claims, 2 Drawing Sheets

{ }
INTERFERENCE CANCELLING CIRCUIT AND METHOD

TECHNICAL FIELD

The present invention generally relates to telephone data signal transmission and more particularly to the cancellation of crosstalk signals therein.

BACKGROUND OF THE INVENTION

Crosstalk is an unwanted interference signal which is coupled to one communication circuit from signals flowing in one or more other communication circuits. For example, in telephone data transmission, crosstalk often results from the electrical coupling between pairs of a multi-pair telephone cable. Generally, noise and intersymbol interference, and not crosstalk, have been the most important source of interference in subscriber loop receivers. However, since crosstalk increases with frequency and since higher frequencies are now being utilized for telephone data transmission over subscriber loops, crosstalk may become the predominant interference signal in some subscriber loop circuits. Thus, the elimination of crosstalk is becoming an important problem in subscriber loop circuits.

SUMMARY OF THE INVENTION

In accordance with the present invention, a method and apparatus is disclosed for more accurately determining the desired signal in the presence of crosstalk in the received signal. The present invention first makes a preliminary estimate of the desired signal from the received signal. Next, an estimate of the crosstalk signal is determined by subtracting the estimated desired signal from a delayed version of the received signal. Finally, a refined or final estimate of the desired signal is determined by subtracting the estimated interference signal from a second delayed version of the received signal. In one embodiment, the estimate of the crosstalk signal is a two step process where a first estimate of the crosstalk signal is further processed to obtain a second estimate which then is subtracted from the second delay version of the received signal to determine the final estimate of the desired signal.

DETAILED DESCRIPTION

Figure 1:
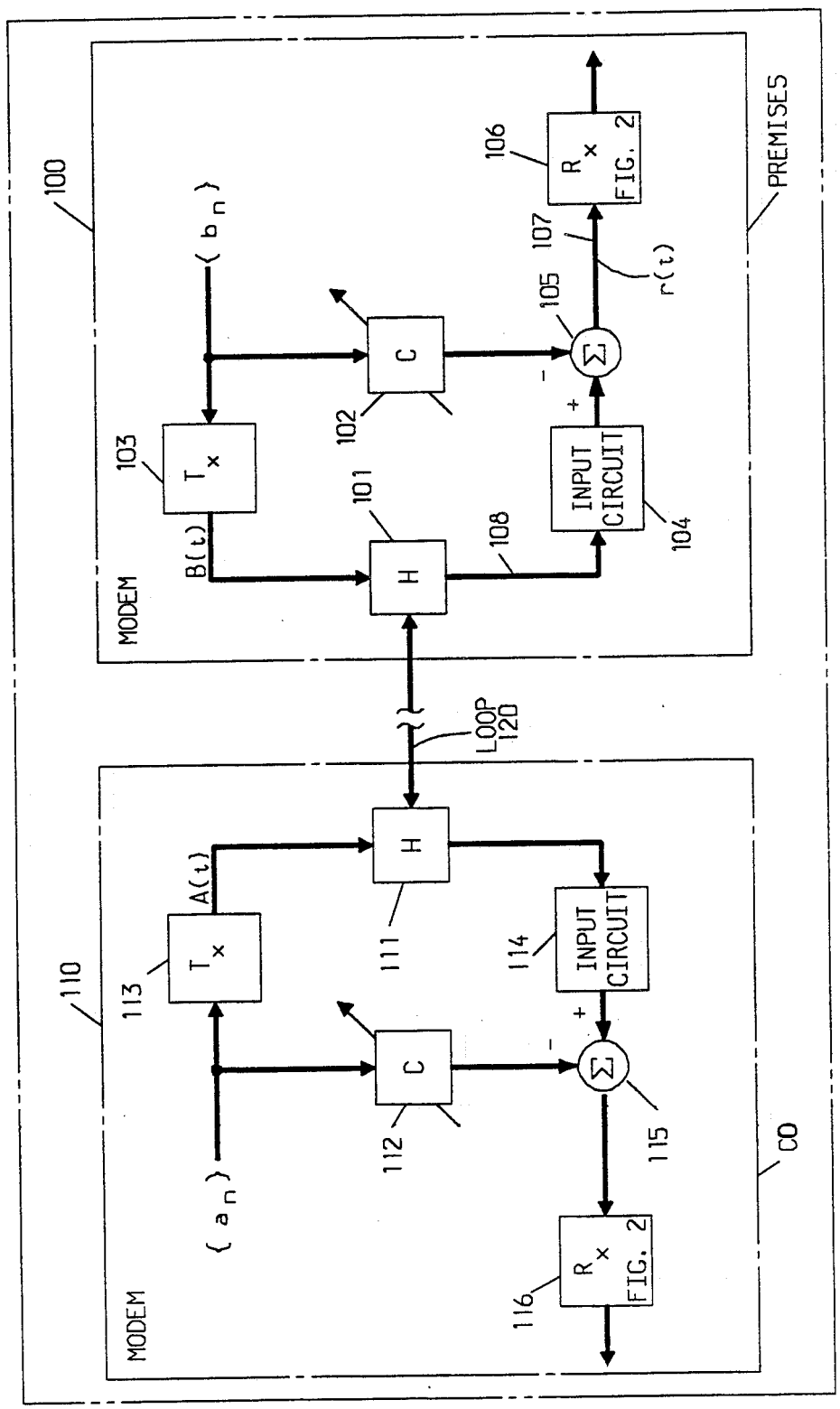
FIG. 1 shows an illustrative block diagram of a digital loop transmission system in which the present invention may be utilized.

Shown in FIG. 1 is an illustrative block diagram of a digital loop system including a subscriber modem 100 connected to a telephone central office (CO) modem 110 over a transmission path (e.g., a two-wire loop facility 120). The subscriber, or premises, modem 100 includes a well-known circuit arrangement including hybrid 101, adaptive echo canceller 102, transmitter 103, input circuit 104, signal combiner 105 and receiver 106. As will be discussed in a later paragraph with reference to FIG. 2, receiver 106 includes a crosstalk canceller circuit embodying the principles of the present invention.

The CO modem 110 similarly includes hybrid 111, adaptive echo canceller 112, transmitter 113, input circuit 114, signal combiner 115 and receiver 116. Again, receiver 116 may also include the crosstalk canceller circuit of the present invention.

Signals $\{a_n\}$ and $\{b_n\}$ represent a sequence of multi-level data symbols which represent, respectively, samples of analog signals A(t) and B(t), or data streams produced by digital data machines. These signals $\{a_n\}$ and $\{b_n\}$ are transmitted, respectively, by the CO modem 110 and the premises modem 100. The digital signals $\{a_n\}$ are modulated into an analog signal by transmitter 113 and transmitted from the CO modem using transmitter 113, hybrid 111 and facility 120. The echo (mostly near-end echo) caused by the hybrid 111 and facility 120 causes a small fraction of the transmitted analog signals to be coupled as an echo signal to the input circuit 114 via hybrid 111. Input circuit 114 is well known and typically includes an analog bandpass filter, an automatic gain control and an analog to digital converter (A/D). In a conventional manner, adaptive echo canceller 112 couples some of the digital signals $\{a_n\}$ to signal combiner 115 where it cancels any transmitted signal echo present at the output of input circuit 114. The resultant digital signal outputted from combiner 115 is applied to receiver 116 for detection.

During the transmission over facility 120, the analog representation of the signals $\{a_n\}$ is corrupted by crosstalk and noise signals. At the premises modem 100, the received signal is coupled via hybrid 101, input circuit 104 and combiner 105 to receiver 106.

In a similar manner, the digital signals $\{b_n\}$ from the premises modem 100 are converted to analog form and transmitted by transmitter 103 via hybrid 101 to facility 120. At the CO modem 110, the analog signals are received at hybrid 111, and processed by input circuit 114. The output of input circuit 114 is coupled via combiner 115 to receiver 116. Echo canceller 102 couples a portion of the digital signals $\{b_n\}$ to combiner 105 to cancel any transmitted signal echo present at the output of input circuit 104.

The following description describes the signals at, and operation of, receiver 106 at the premises modem. The signal input to receiver 106 can be either in analog or digital form and, in the former case, can illustratively be represented by the well-known expression shown below:

$$r(t) = \sum_n a_n p_1(t - nT) + \sum_n b_n p_2(t - nT - T_2) +$$

$$V_0(t) + \sum_n X_n p_3(t - nT - T_3)$$

wherein the addends of the above sum are, respectively, the desired signal (i.e., $\{a_n\}$), the residual echo signal $$\left(\text{i.e., } \sum_n b_n p_2(t - nT - T_2)\right),$$

the uncancelled echo signal outputted from combiner 105), the background noise signal, ($V_0(t)$) and the crosstalk signal $$\left( \sum_n X_n p_3(t - nT - T_3) \right),$$

where the crosstalk signal is generated in a manner similar to the data signal. However, such a limitation on the crosstalk is not a requirement for the operation of the present invention. The residual signal, noise signal and crosstalk signal collectively interfere with the reception of the desired signal. The crosstalk signal includes the near-end crosstalk (NEXT) introduced by another transmitter (not shown), either co-located at modem 100 or closely located to modem 100, which transmits over a facility wire pair which shares the same cable as facility 120.

To simplify the expression for r(t), we lump the uncancelled echo and the noise together and call this quantity V(t). If the desired signal is represented as A(t) and the crosstalk signal as X(t), then the crosstalk-corrupted signal r(t) becomes:

$$r(t) = A(t) + V(t) + X(t)$$

While the following analysis is described for the subscriber modem 100, it applies equally to the CO modem 110. Additionally, while the following description is described in terms of pulse amplitude modulated (PAM) baseband signals, it can be generalized in a straightforward manner to apply to quadrature amplitude modulation (QAM) signalling and passband signalling (e.g., see my co-pending U.S. Pat. application: R. D. Gitlin, et al., Ser. No. 171,636, filed on Mar. 22, 1988).

Figure 2:
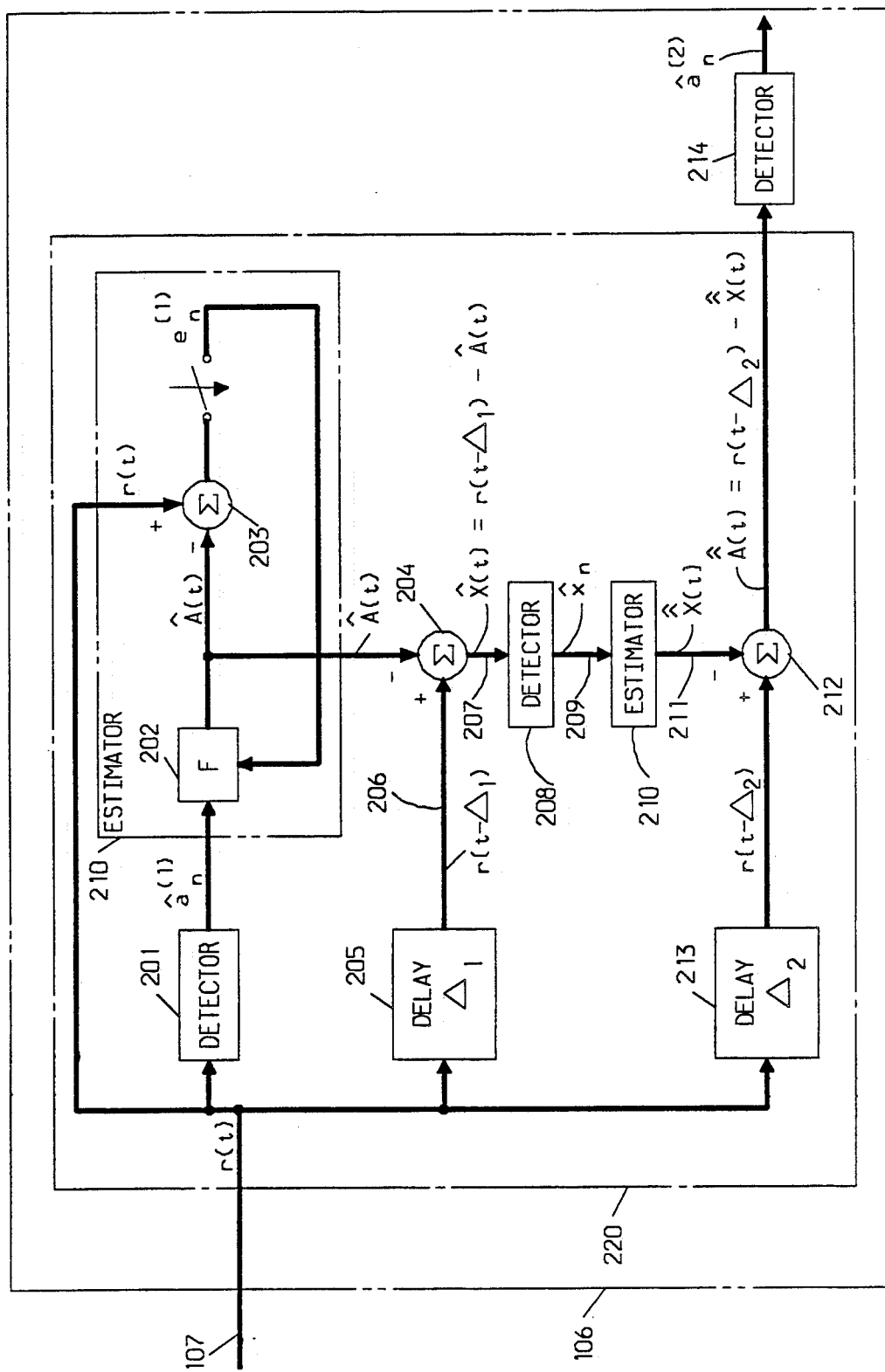
FIG. 2 shows an illustrative block diagram of a receiver embodying the principles of the present invention which can be used in the transmission system of FIG. 1.

The following description refers to FIG. 2 which shows an exemplary block diagram of receiver 106, including the crosstalk canceller circuit 220 and detector 209. The receiver, in accordance with the present invention, utilizes well-known linear cancellers for adaptively cancelling the crosstalk signal X(t) from the received signal r(t).

In accordance with the present invention, as will be described in detail below, crosstalk canceller circuit 220 first makes an estimate of the desired signal A(t), denoted A(t). This is possible because the signal power of A(t) is generally significantly greater than the combined power of the noise and crosstalk signals. Next, an estimate of the crosstalk signal, X(t), is determined by subtracting the estimated desired signal A(t) from a first delayed version of the received signal r(t). Finally, a refined estimate of the desired signal, A(t), is obtained by subtracting the estimated crosstalk signal X(t) from a second delayed version of the received signal r(t).

While FIG. 1 described a system including modems 100 and 110 connected for duplex transmission over a two-wire facility 120, it should be understood that the present invention can be utilized in modems using simplex transmission over a four-wire facility. Such a four-wire facility connection may not require the hybrids 101 and 111, the echo canceller 102 and 112 or the combiner 105 and 115. Thus, for example, the receiver 106 would connect to the receive pair via input circuit 104 and accept signals over lead 108. The transmitter 103 would connect to the transmit pair of the four-wire facility. With such a four-wire facility, the crosstalk problem would still exist, however, thereby requiring the use of the present invention.

With reference to FIG. 2, the receiver 106 includes a conventional detector 201 for detecting signals of the pulse amplitude modulation (PAM) type. For a received signal r(t) encoded using other types of modulation, the appropriate detector 201 would be utilized.

The detector 201, which generates or forms a tentative decision $â_n^{(1)}$ (a preliminary estimate of data symbols of the desired signal A(t), may be implemented in a conventional manner. This detector may comprise any circuitry capable of forming tentative decisions as to the values of the transmitted data signals. It may comprise, for example, circuitry which is conventionally used to form "final" decisions, such as the adaptive transversal equalizer/demodulator/decision-former circuitry shown in U.S. Pat. No. 4,376,308 issued on Mar. 8, 1983, to B. E. McNair; U.S. Pat. No. 4,245,345 issued Jan. 13, 1981, to R. D. Gitlin, et al.; U.S. Pat. No. 4,237,940 issued Jan. 27, 1981to K. H. Mueller, et al.; and U.S. Pat No. 4,237,554 issued Dec. 2, 1980, to R. D. Gitlin, et al. Detector 201 could also include decision feedback equalization circuitry, such as shown by D. A. George et al. in "An Adaptive Decision Feedback Equalizer", *IEEE Trans. on Comm. Tech.*, VOl. COM-19, No. 3, June, 1971, pp. 281-293; and by D. D. Falconer in "Application of Passband Decision Feedback, Equalization in Two-Dimensional Data Communication Systems", *IEEE Trans. on Communications*, Vol. COM-24, No. 10, October, 1976, pp. 1159-1166. Detector 201 could also include the nonlinear feed-forward and feedback equalization circuitry shown in U.S. Pat. Nos. 4,213,095 and 4,181,888 issued to D. D. Falconer on July 15, 1980, and Jan. 1, 1980, respectively. The above documents are hereby incorporated by reference.

The receiver 104 operates such that detector 201 generates tentative decisions $â_n^{(1)}$ with a bit error rate at least as good as $10^{-3}$. Such a bit error rate is not good enough for most applications. The tentative decision signals $â_n^{(1)}$ are inputted to an adaptive linear signal estimator 210 which produces the aforementioned estimate, A(t), of the desired signal A(t). The adaptive signal estimator 210 includes an adaptive filter 202 having weights $\{f_i\}$ which are adjusting using a well-known least mean square (LMS) algorithm to minimize the squared error $[e_n^{(1)})^2$, which represents the reconstruction error between A(t) and A(t) at the data rate. This is illustratively achieved by comparing the estimate A(t) with the received signal r(t) in combiner 203 and producing an error signal $e_n^{(1)}$. The error signal is fed back to adaptive filter 202 to appropriately adjust the filter weights to minimize the LMS reconstruction error between the A(t) and A(t) signals. The adaptive filter 202 arrangement for minimizing LMS reconstruction error can be implemented in a well-known manner. For example, see pages 385 to 394 of the book entitled *Digital Communications* written by E. A. Lee and D. G. Messerschmit and published by Kluwer Academic Publishers in 1988. See also my U.S. Pat. No. 4,412,341 issued on Oct. 29, 1983 to A. Gersho, et al.

Note, the combiner 203, as well as other combiners (e.g., 204, 207) described herein, operate in a well-known manner to combine corresponding samples of digital signals which appear at its plus (+) and minus (−) inputs. The input signals to combiner 203 are appropriately timed so that they can be applied substantially concurrently to combiner 203.

After minimizing the LMS error, adaptive filter 210 outputs the estimated signal A(t) to the negative (−) input of combiner 204 where it is subtracted from a delayed version of received signal r(t) appearing on lead 206. The delay $\Delta_1$ generated by delay circuit 205 is used to accommodate the processing delay in detector 201 and adaptive filter 202. Delay circuit 205 produces, in a well-known manner, the appropriate delay, $\Delta_1$, taking into consideration the data bit rate of the received signal r(t).

The output of combiner 204 is $r(t-\Delta_1)-A(t)$, which is a reasonably accurate estimate of the crosstalk signal, X(t). Note, the present invention assumes that the crosstalk signal X(t) is larger than the noise and uncancelled echo signal V(t) and, hence, the output X(t) of combiner 204 is a reasonably accurate estimate of the crosstalk signal V(t).

In accordance with another aspect of the present invention, a better estimate of the crosstalk may be obtained by passing the first estimate of the crosstalk signal X(t), 207, through a detector 208 to generate an estimate of the crosstalk data symbols $x_n$. This estimate $x_n$ which appears at the output 209 of detector 208 is then processed by an adaptive linear estimator 211 to provide a very accurate second estimate of the crosstalk signal X(t). Note, detector 208 may be implemented in the same manner as the previously devised detector 201. The adaptive linear estimator 211 may be implemented in the same manner as the previously discussed estimator 210.

It should be noted that if the crosstalk is due to an interfering signal which uses a different modulation scheme (perhaps nonlinear) than the desired signal, the crosstalk estimate X(t) can be generated in a manner consistent with the form of modulation used by that interfering signal. Thus, in such a circumstance detector 208 and estimator 211 will adapt to this new operating mode.

The estimated crosstalk signal X(t) is subtracted by combiner 212 from a second delayed version of the received signal, i.e., $r(t-\Delta_2)$. Delay circuit 213 produces a delay, $\Delta_2$, which accommodates the delay of the previously described circuits 201-211 in generating the estimated crosstalk signal X(t). The output of combiner 212 is the signal A(t), which is a second estimate of the desired signal A(t), which is equal to $r(t-\Delta_2)-X(t)$. This signal is processed using detector 209 to adaptively produce an improved final or final estimate $\hat{a}_n^{(2)}$ of data symbols of the desired signal. Detector 214 may be implemented using the same types of circuits described for detector 201.

It is expected that, if the bit error rate of detector 201 and adaptive filter 202 is $P_r[\hat{a}_n^{(1)} \neq a_n]$ and it is equal to $10^{-3}$, then the receiver 106 bit error rate, $Pr[\hat{a}_n^{(2)} \neq a_n]$, should be equal to approximately $10^{-7}$. The adaptation of detector 214 is based on the LMS algorithm, whose error is based on the final decision $\hat{a}_n$.

In an alternate embodiment of FIG. 2 (not shown), the estimate of the crosstalk signal X(t) which is output from combiner 204 may connect directly to combiner 212. In such an embodiment, detector 208 and adaptive linear estimator 211 are not utilized and the delay $\Delta_2$ produced of delay circuit 213 is adjusted accordingly.

The present invention is applicable not only to baseband, but also to passband systems. The present invention can also be applied to systems using n-dimensional ($n \geq 2$) modulation, systems using one-dimensional modulation (e.g., amplitude modulation), as well as systems using coded and trellis coded modulation.

In addition, it should be emphasized the invention is applicable not only to transmission over voiceband telephone channels, but other types of channels, such as optical or microwave radio channels. Moreover, the invention can also be used for reducing the effects of other types of interferences, such as inter-symbol interference. Thus, the present invention can be implemented using the well-known technologies utilized in discrete, hybrid, integrated circuits or microprocessors.

What has been described is merely illustrative of the application of the principles of the present invention. Other methods and circuits can be implemented by those skilled in the art without departing from the spirit and scope of the present invention.

I claim:

1. Apparatus for detecting a desired digital data signal in a received signal corrupted by a crosstalk signal, said apparatus comprising:
   first estimating means for forming an estimate of the desired signal from the received signal,
   second estimating means for forming an estimate of the crosstalk signal in the received signal by subtracting the estimated desired signal from the received signal, and
   means for determining the desired signal by subtracting the estimated crosstalk signal from the received signal.

2. The apparatus of claim 1 wherein the first estimating means includes:
   detector means for generating an estimate of data symbols of the desired signal from said received signal, and
   means for adjusting said estimate of data symbols to form said estimated desired signal so that the mean squared error between said estimated desired signal and said received signal is minimized.

3. The apparatus of claim 2 wherein the adjusting means includes an adaptive linear signal estimator.

4. The apparatus of claim 1 wherein said second estimating means includes:
   delay means for delaying the received signal for a period of time equal to the time required for said first estimating means to form the estimated desired signal, and
   subtracter means for forming the estimate of the crosstalk signal by subtracting the estimated desired signal from the first delayed received signal.

5. The apparatus of claim 4 wherein the second estimating means further includes:
   detector means for generating an estimate of crosstalk data symbols from said estimate of the crosstalk signal, and
   means for adjusting said estimate of crosstalk data symbols to form a refined estimate of the crosstalk signal for output to said determining means.

6. The apparatus of claim 4 wherein said determining means includes:
   second delay means for delaying the received signal for a second period of time equal to the delay of the first delay means plus the delay of said subtracter means, and
   second subtracter means for forming the desired signal by subtracting the estimated crosstalk signal from the second delayed received signal.

7. The apparatus of claim 6 further including second detector means connected to said second subtracter means for receiving a second estimate of the desired signal and for generating data symbols representing the desired signal.

8. A modem for processing a received crosstalk-corrupted signal to obtain a desired digital data signal, said modem comprising:
   means for coupling the received signal from a transmission path to a first estimating means and coupling a transmit signal from a transmitter of said modem to said transmission path,
   first estimating means for forming an estimate of the desired signal from the received signal,
   second estimating means for generating an estimate of a crosstalk signal by subtracting the estimated desired signal from the received signal, and
   means for determining a second estimate of the desired signal by subtracting the estimated crosstalk signal from the received signal.

9. The modem of claim 8 wherein the first estimating means includes detector means for generating an estimate of data symbols of the desired signal from said received signal, and
   means for adjusting said estimate of data symbols to form said estimated desired signal so that the mean squared error between said estimated desired signal and said received signal is minimized.

10. The modem of claim 8 further comprising:
    detector means connected to said determining means for receiving said second estimate of the desired signal and for generating a series of digital data bits representing the desired signal.

11. The modem of claim 8 wherein the second estimating means includes:
    delay means for delaying the received signal for a period of time equal to the time required for said first estimator means to form the estimated desired signal,
    subtracter means for forming the estimated crosstalk signal by subtracting the estimated desired signal from the first delayed received signal,
    detector means for generating an estimate of crosstalk data symbols from the estimated crosstalk signal, and
    means for adjusting said estimate of crosstalk data symbols to form a refined estimate of the crosstalk signal for output to said determining means.

12. A method for processing a crosstalk-corrupted received signal representing a desired digital data signal, said method comprising the steps of:
    forming an estimate of the desired signal from the received signal,
    generating an estimate of a crosstalk signal in the received signal by subtracting the estimated desired signal from the received signal, and
    determining the desired signal by subtracting the estimated crosstalk signal from the received signal.

13. The method of claim 12 wherein the forming step includes the step of generating an estimate of data symbols of the desired signal from said received signal, and
    adjusting said estimate of the data symbols to form said estimated desired signal so that the mean squared error between said estimated desired signal and said received signal is minimized.

14. The method of claim 12 wherein said generating step includes the steps of:
    delaying the received signal for a first period of time which is equal to the time required for said forming means to form the estimated desired signal, and
    estimating the crosstalk signal by subtracting the estimated desired signal from the first delayed received signal,
    generating an estimate of crosstalk data symbols from said estimate of the crosstalk signal, and
    adjusting said estimate of crosstalk data symbols to form a refined estimate of the crosstalk signal for output to said determining step.

15. The method of claim 12 wherein said determining step includes the steps of:
    delaying the received signal for a second period of time equal to the delay of the first period of time plus the delay of the generating step, and
    forming the desired signal by subtracting the estimated crosstalk signal from the second delayed received signal.

* * * * *